United States Patent Office 2,710,863
Patented June 14, 1955

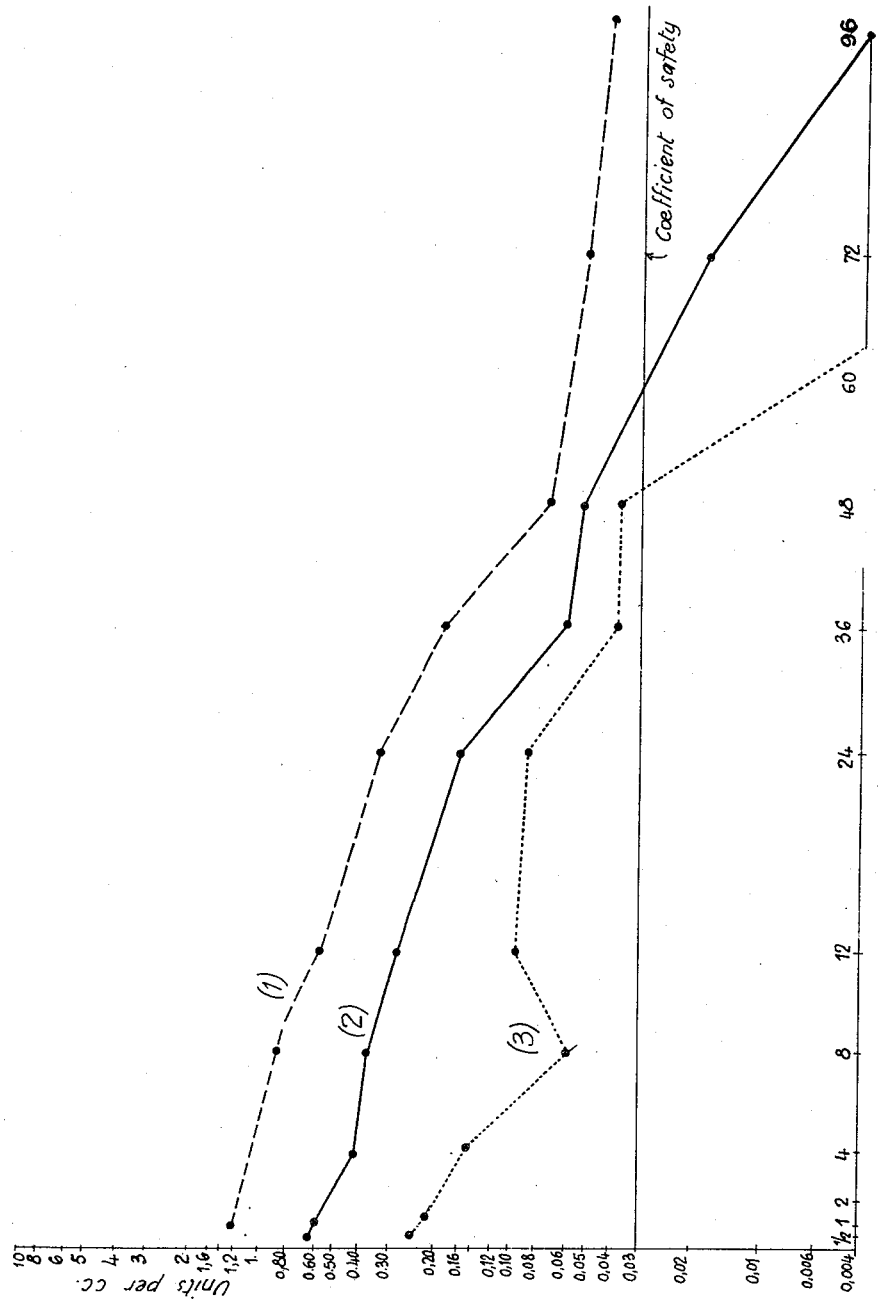

2,710,863

PENICILLIN BENZHYDRYL-AMINE SALT

Henry Penau and Guy Hagemann, Paris, France, assignors to Les Laboratoires Francais De Chimiotherapie, Paris, France, a French body corporate Application January 4, 1952, Serial No. 264,876

Claims priority, application France January 9, 1951

1 Claim. (Cl. 260—239.1)

The present invention relates to penicillin compounds and more particularly to compounds of penicillin with organic bases, said compounds having a prolonged effect due to their low solubility in water and in blood serum, and to a method of making same.

One object of this invention consists in providing a penicillin compound which is capable of prolonging the active penicillin blood level for 48 hours instead of 3–4 hours when administering the known penicillin sodium or potassium salts.

Another object of this invention consists in providing a penicillin compound which is insoluble or only slightly soluble in water or aqueous solutions, as well as in vegetable oils, but which is soluble in absolute alcohol and in certain other organic solvents.

Still another object of this invention consists in providing a penicillin compound which is stable even on heating to 100° C. for about 48 hours.

A further object of this invention consists in providing a method of making said penicillin compounds in a simple, inexpensive, and effective manner.

Another object of this invention consists in providing a simple process to produce, in good yields, relatively pure penicillin in the form of its new compounds from aqueous solutions of penicillin.

Other objects of this invention will become apparent from the specification and the examples given hereinafter.

In accordance with this invention, new compounds of penicillin are produced by reacting, in its free acid form, penicillin with organic amino bases and more particularly with organic amino bases of the following formula

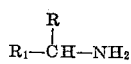

In this formula, R represents an alkyl radical, especially a methyl radical, or an aryl radical, especially a phenyl radical, while $R_1$ is either an aryl radical, especially a phenyl radical when R is an aryl radical, or an alkyl radical with 5 or 6 carbon atoms, especially a methyl butyl or a methyl pentyl radical when R is an alkyl radical. Especially suitable for the combination with penicillin are the following amines: Amino diphenyl methane (benzhydryl amine), amino - 2 - methyl - 4 - hexane, amino-2-methyl-6-heptane.

The new compounds may also be obtained by the method of double decomposition, i. e. by reacting a salt of penicillin with a salt of said organic amino base.

The reaction of penicillin or a salt of penicillin with the organic amino base or its salt is carried out, for instance, in a solvent in which the penicillin or its salt is soluble and the resulting reaction product is insoluble. Preferably, the organic base or its salt should also be soluble in said solvent.

One may, however, proceed in such a manner that the penicillin in its free acid form and the free organic amino base are reacted in a solvent in which these starting materials as well as the reaction product are soluble whereafter the reaction product is isolated from the resulting solution by evaporation of the solvent or by precipitation by the addition of another solvent in which the reaction product is insoluble.

As "penicillin" there may be used for the purpose of this invention not only the compound known as penicillin G which is also referred to as benzyl penicillin, but also other forms of penicillin of similar structure which differ only in that the benzyl group is replaced by other monovalent organic radicals, generally radicals having five or more carbon atoms. Penicillin F wherein the benzyl radical is substituted by the Δ2-pentenyl radical, dihydro penicillin F wherein it is substituted by the n-amyl radical, penicillin X wherein it is substituted by the p-hydroxy benzyl radical, penicillin K wherein it is substituted by the n-heptyl radical and mixtures of various penicillins may also be used. Penicillin G, however, on account of its higher activity, is the preferred penicillin used in this invention.

The alkali salts of penicillin, especially the sodium, potassium and ammonium salts are used with great advantage in the method of this invention. Other salts of penicillin, such as the alkaline earth metal salts, especially the calcium salt, but also water soluble salts of penicillin with suitable organic bases such as the triethylamine salt and more generally the trialkylamine salts, may be used likewise.

The above mentioned organic amino bases may be employed in the free base form or in the form of their salts, such as the sulfates, hydrochlorides and phosphates.

The products formed according to this invention by the reaction between penicillin and its salts and the above mentioned amino bases and their salts are believed to be the salts of the acid penicillin.

Any organic solvent may be employed as the solvent medium for the salt formation in the practice of the present invention. Preferably, however, a solvent is used wherein the resulting reaction product is insoluble and, thus precipitates therefrom. The reaction is preferably carried out in water because the reaction product is practically insoluble therein and is obtained in a comparatively pure state while the other reaction components, if present, remain in solution.

The new penicillin compounds are administered by subcutaneous or intramuscular injection in the form of suspensions in an aqueous or in an oily medium. They may also be employed in the form of solutions having a viscosity higher than that of water.

The following examples serve to illustrate the invention without, however, limiting the same thereto.

*Example 1*

10 gr. of crystalline potassium penicillin are dissolved in a mixture of 30 cc. of water and 6 cc. of acetone. Said solution is added to a solution of 6 g. of amino diphenyl methane hydrochloride in 70 cc. of water. By double decomposition the new compound is formed. It crystallizes rapidly from the aqueous acetonic solution. It is filtered and dried in a vacuum. The new compound has the following characteristic properties:

Composition: Amino diphenyl methane salt of benzyl penicillin of the general formula:

Activity: 1,150 units per mg.
Melting point: 159° C.
Optical rotation: $(\alpha)_J: +206°$.
Solubility in water at 24° C.: 0.7%.
Solubility in vegetable oils: Insoluble.
Stability at 100° C.: For at least 48 hours.

Example 2

10 g. of crystalline penicillin triethylamine salt are dissolved in 30 cc. of water. To this solution is added a solution of 5 g. of amino-2-methyl-4-hexane sulfate in 40 cc. of water. The new compound, formed by double decomposition, crystallizes rapidly. It is filtered off and dried in a vacuum. The new compound has the following characteristic properties:

Composition: Amino-2-methyl-4-hexane salt of benzyl penicillin of the general formula:

$$(C_{16}H_{18}O_4N_2S).(C_7H_{17}N)$$

Activity: 1,320 units per mg.
Melting point: 111° C.
Optical rotation: $(\alpha)_J$: +211°.
Solubility in water at 20° C.: 0.58%.
Solubility in vegetable oils: Insoluble.
Solubility in absolute alcohol: Very soluble.

Example 3

10 gr. of pure potassium penicillin are dissolved in 30 cc. of water. To this solution is added a solution of 5.5 g. of amino-2-methyl-6-heptane sulfate in 25 cc. of water. The new compound, formed by double decomposition, crystallizes rapidly. It is filtered and dried in a vacuum. The new compound has the following characteristic properties:

Composition: Amino-2-methyl-6-heptane salt of benzyl penicillin of the general formula:

$$(C_{16}H_{18}O_4N_2S).(C_8H_{19}N)$$

Activity: 1,280 units per mg.
Melting point: 117° C.
Optical rotation: $(\alpha)_J$: +223°.
Solubility in water at 20° C.: 1.2%.
Solubility in vegetable oils: Insoluble.
Solubility in alcohol and chloroform: Very soluble.

Example 4

A solution of 35.6 g. of crystalline sodium penicillin in 120 cc. of distilled water is cooled to 0° C. in an ice bath while stirring and is diluted with 120 cc. of ice cold chloroform. The pH of the stirred cold solution is adjusted to 2.7 by the addition of an aqueous solution of phosphoric acid. The mixture is separated and the aqueous layer is treated with 25 cc. of cold chloroform and sufficient phosphoric acid solution to adjust the pH of the solution to 2.5. The layers are again separated and the chloroform solutions are combined. The extraction is repeated with an additional 25 cc. of chloroform. The combined chloroform extracts are washed with 25 cc. of cold distilled water and are then dried by shaking with sufficient anhydrous sodium sulfate (10—15 g.) to give a clear solution. The sodium sulfate is removed by filtration and is washed on the filter with 10 cc. of cold chloroform.

To the combined chloroform solutions obtained in this manner and containing free acid penicillin, there are added 13.0 g. of 2-amino-6-methyl heptane, dissolved in 130 cc. of chloroform, said solution being previously cooled to about 0° C. The temperature during the addition of the chloroform solution of the base is maintained at about 0° C.

Thereafter petroleum ether in sufficient amounts is added to said chloroform solution, causing precipitation of the 2-amino-6-methyl heptane salt of penicillin. After allowing the precipitate to stand for three hours at about 0° C. it is filtered off and dried in a vacuum. The resulting salt corresponds to that obtained according to Example 3.

In all these examples, the yield of the compounds produced is about 90%.

As mentioned above the new penicillin compounds can be administered by subcutaneous or intramuscular injection in the form of suspensions in an aqueous or oily medium. They may also be employed in the form of solutions having a viscosity higher than that of water by incorporating in the aqueous solutions thickeners such as phenoxy-ethanol, methyl-cellulose, or propyleneglycol.

The clinical tests carried out by means of injectable preparations of compounds of penicillin G and of the aforementioned organic amino bases and in particular of the amino diphenyl methane (benzhydryl-amine) salt of benzyl penicillin have shown the following advantages in employing these preparations:

1. Perfect tolerance on the part of patient for the benzyhydrylamine salt of benzyl-penicillin, in both the aqueous suspension and the injectable oily suspension states.

No pain experienced upon injection.

The injectable suspension may be prepared with either sterile bi-distilled water or with standard isotonic solution of glucose or with standard isotonic solution of sodium chloride.

2. Contrary to that found from other compounds of penicillin G, the organic amino base entering into the combination does not produce physiological side-effects.

3. The aqueous or oily suspensions of benzhydrylamine salt of benzylpenicillin give a marked initial penicillinemia and are clearly superior to the tested commercial forms of delayed-action penicillin in other respects.

The 100% coefficient of safety, that is to say a concentration in blood of 0.03 unit per cubic centimetre at the 48th hour is obtained by intramuscular injection of the oily suspension of benzhydrylamine salt of benzylpenicillin at 300,000 units per cubic centimetre, which is a clear advantage over known injectable preparations, especially those having a procaine salt of benzylpenicillin base.

This is shown by the annexed chart in which three curves have been plotted representing the concentration of penicillin in blood at various intervals over a period of time after an injection of 300,000 units of penicillin in an oily suspension. The abscissae represent hours and the ordinates units of penicillin per cubic centimetre of blood on a logarithmic scale. Ten patients have been thus treated.

Curve (1) represents the maximum concentration of penicillin in blood obtained.
Curve (3) represents the minimum concentration of penicillin in blood obtained.
Curve (2) represents the mean concentration of penicillin in blood obtained.

It appears from these curves that in each case after 48 hours the concentration of penicillin in blood is above the coefficient of safety.

4. A study of the penicillinemia as shown by the chart reveals a flattened elimination curve, possessing a high constant concentration of penicillin in the blood, but there is no elimination tailing off that would provoke the phenomena of penicillin resistance.

5. The physical structure of the crystals of benzhydrylamine salt of benzylpenicillin makes possible the preparation of stable oily suspensions, without the addition of gelifying substances such as aluminium monostearate, the latter being likely to present drawbacks in certain cases.

6. There should be mentioned the possibility of combining in the same injectable preparation the benzhydrylamine (or other organic amino bases mentioned above) salt of benzylpenicillin with a hydrosoluble penicillin G or with other insoluble penicillins such as procaine penicillin.

We claim:

A salt of penicillin G with amino diphenyl methane of the following formula (penicillin G).($C_{13}H_{13}N$) said salt having a melting point of about 159° C. and an optical rotation $(\alpha)_J$ of about +206°, said salt being very slightly soluble in water and substantially insoluble in vegetable oils, said salt, on therapeutic administration, having a prolonged penicillin effect.

References Cited in the file of this patent

UNITED STATES PATENTS

| | | |
|---|---|---|
| 2,493,625 | Goldberg et al. | Jan. 3, 1950 |
| 2,515,898 | Rhodehamel | July 18, 1950 |
| 2,527,810 | Goldberg et al. | Oct. 31, 1950 |
| 2,528,174 | Rhodehamel | Oct. 31, 1950 |
| 2,547,640 | Goldman | Apr. 3, 1951 |
| 2,550,398 | Baral | Apr. 24, 1951 |
| 2,627,491 | Szabo | Feb. 3, 1953 |
| 2,637,679 | Gaunt | May 5, 1953 |
| 2,647,893 | Young | Aug. 4, 1953 |

OTHER REFERENCES

Bachman et al., Duration of Therapeutic Plasma Penicillin Levels with the Penicillin Salt of 1,2-diphenyl-2-methylaminoethanol, Feb. Procs., vol. 10, March 1951, p. 277.

Physicians Bulletin, Nov.–Dec., 1945, p. 183, published by Eli Lilly Co., Indianapolis.

Rhodehamel, "J. Am. Chem. Soc." vol. 72, 1950, p. 3302.

British Report CMR-Br. 234 (P. B. 79927) Dec. 5, 1947, pp. 1–5.